(12) United States Patent
Pedrosa et al.

(10) Patent No.: US 10,891,770 B2
(45) Date of Patent: Jan. 12, 2021

(54) SYSTEMS AND METHODS FOR AUGMENTED REALITY VIDEO FEED ON AN UNMANNED VEHICLE

(71) Applicant: FLIR UNMANNED AERIAL SYSTEMS ULC, Vancouver (CA)

(72) Inventors: Marco Peter Silva Pedrosa, Waterloo (CA); Mark Nathan Holden, Arvada, CO (US); Marcus White, Cambridge (CA); Charles R. Elliott, Cambridge (CA)

(73) Assignee: FLIR UNMANNED AERIAL SYSTEMS ULC, Vancouver (CA)

(*) Notice: Subject to any disclaimer, the term of this patent is extended or adjusted under 35 U.S.C. 154(b) by 0 days.

(21) Appl. No.: 16/394,710

(22) Filed: Apr. 25, 2019

(65) Prior Publication Data

US 2019/0333260 A1 Oct. 31, 2019

Related U.S. Application Data

(60) Provisional application No. 62/662,518, filed on Apr. 25, 2018.

(51) Int. Cl.
*G06T 11/60* (2006.01)
*G06T 7/50* (2017.01)
*B64C 39/02* (2006.01)
*B64D 47/08* (2006.01)

(52) U.S. Cl.
CPC ............ *G06T 11/60* (2013.01); *B64C 39/024* (2013.01); *B64D 47/08* (2013.01); *G06T 7/50* (2017.01); *B64C 2201/027* (2013.01); *B64C 2201/127* (2013.01); *G06T 2207/10032* (2013.01)

(58) Field of Classification Search
CPC . G06T 11/60; G06T 7/50; G06T 2207/10032; G06T 11/00; G06T 7/60; G06T 2207/30244; G06T 17/05; B64C 39/024; B64C 2201/127; B64C 2201/027; B64C 39/02; B64D 47/08
See application file for complete search history.

(56) References Cited

U.S. PATENT DOCUMENTS

2012/0070071 A1* 3/2012 Rankin ............... G06K 9/00805
382/154
2014/0267723 A1* 9/2014 Davidson, Jr. .......... G06T 11/60
348/147
2019/0034056 A1* 1/2019 Eisenmann ......... G06F 3/04815

* cited by examiner

*Primary Examiner* — Xilin Guo
(74) *Attorney, Agent, or Firm* — Haynes and Boone, LLP

(57) ABSTRACT

A remote station and method for rendering a ground plane over video feed are provided. The remote station comprises a processor, a communication interface for communicating with an unmanned vehicle (UV), and a non-transitory memory device storing a communications module. The communications module comprises machine-readable instructions that, when executed by the processor, causes the processor to render a ground plane over video feed. The method comprises receiving a video feed from a camera on a UV, receiving from the UV telemetry information of the camera, receiving from the camera a zoom factor of the camera, calculating a horizon of the camera at a UV controller of the UV, and rendering the horizon as an overlay image on the video feed at a display of the UV controller.

20 Claims, 16 Drawing Sheets

SYSTEMS AND METHODS FOR AUGMENTED REALITY VIDEO FEED ON AN UNMANNED VEHICLE

CROSS-REFERENCE TO RELATED APPLICATIONS

This application claims all benefit including priority to U.S. Provisional Patent Application 62/662,518, filed Apr. 25, 2018, and entitled: "Systems and Methods for Augmented Reality Video Feed on an Unmanned Aerial Vehicle," which is hereby incorporated by reference in its entirety.

FIELD

This disclosure generally relates to the field of unmanned vehicles, and in particular to augmented reality video feed on an unmanned vehicle.

BACKGROUND

An unmanned aerial vehicle (UAV) does not have a human operator located at the UAV. A UAV may include various components such as sensors and measurement and navigation instruments. A UAV may carry a payload which may be configured to perform specific duties such as taking aerial photographs and videos.

SUMMARY

In accordance with some embodiments, there is provided a remote station comprising a processor, a communication interface for communicating with an unmanned vehicle (UV), and a non-transitory memory device storing machine-readable instructions that, when executed by the processor, causes the processor to render a ground plane over images or video feed. The processor is configured to receive an image or video feed from a camera on the UV, receive from the UV telemetry information of the camera, receive from the camera a zoom factor of the camera, calculate a horizon of the camera, and render the horizon as an overlay image on the image or video feed.

In accordance with some embodiments, there is provided a method for rendering a ground plane over images or video feed. The method comprises receiving an image or video feed from a camera on an unmanned vehicle (UV), receiving from the UV telemetry information of the camera, receiving from the camera a zoom factor of the camera, calculating a horizon of the camera at a UV controller of the UV, and rendering the horizon as an overlay image on the image or video feed at a display of the UV controller.

In accordance with some embodiments, there is provided an observer overlay system. The observer overlay system comprises a processor, a communication interface for communicating with a camera, and a non-transitory memory device storing machine-readable instructions that, when executed by the processor, causes the processor to render a ground plane over images or video feed from the camera. The processor is configured to receive an image or video feed from the camera, receive telemetry information from the camera, receive a zoom factor of the camera from the camera, calculate a horizon of the camera, and render the horizon as an overlay image on the image or video feed.

In accordance with some embodiments, there is provided a method for rendering a ground plane over images or video feed. The method comprises receiving an image or video feed from the camera, receiving telemetry information from the camera, receiving a zoom factor of the camera from the camera, calculating a horizon of the camera, and rendering the horizon as an overlay image on the image or video feed.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures.

It is understood that throughout the description and figures, like features are identified by like reference numerals.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The term unmanned vehicle (UV) is used herein and may include an unmanned aerial vehicle (UAV), an unmanned aircraft (UA), an unmanned aquatic vessel, an unmanned ground vehicle (UGV), and any other vehicle or structure which may be unmanned, operate autonomously or semi-autonomously, and/or controlled remotely. The UGV may be a remotely controlled, autonomous or semi-autonomous vehicle system which is comprised of a main body and a drive system supported by the main body. In some examples, the drive system is comprised of a propulsion system, such as a motor or engine, and one or more tracks or wheels. Other arrangements, such as a rail or fixed-track ground vehicle, a tether or rope-pulled ground vehicle without a motor or engine, a ground vehicle using balls, sleds or rails, and a ground vehicle which hovers but navigates in proximity to terrain, are also contemplated herein.

Some of the features taught herein are described with reference to embodiments of a UAV by way of example only. However, the description and features may also apply generally to any UV.

Figure 1:
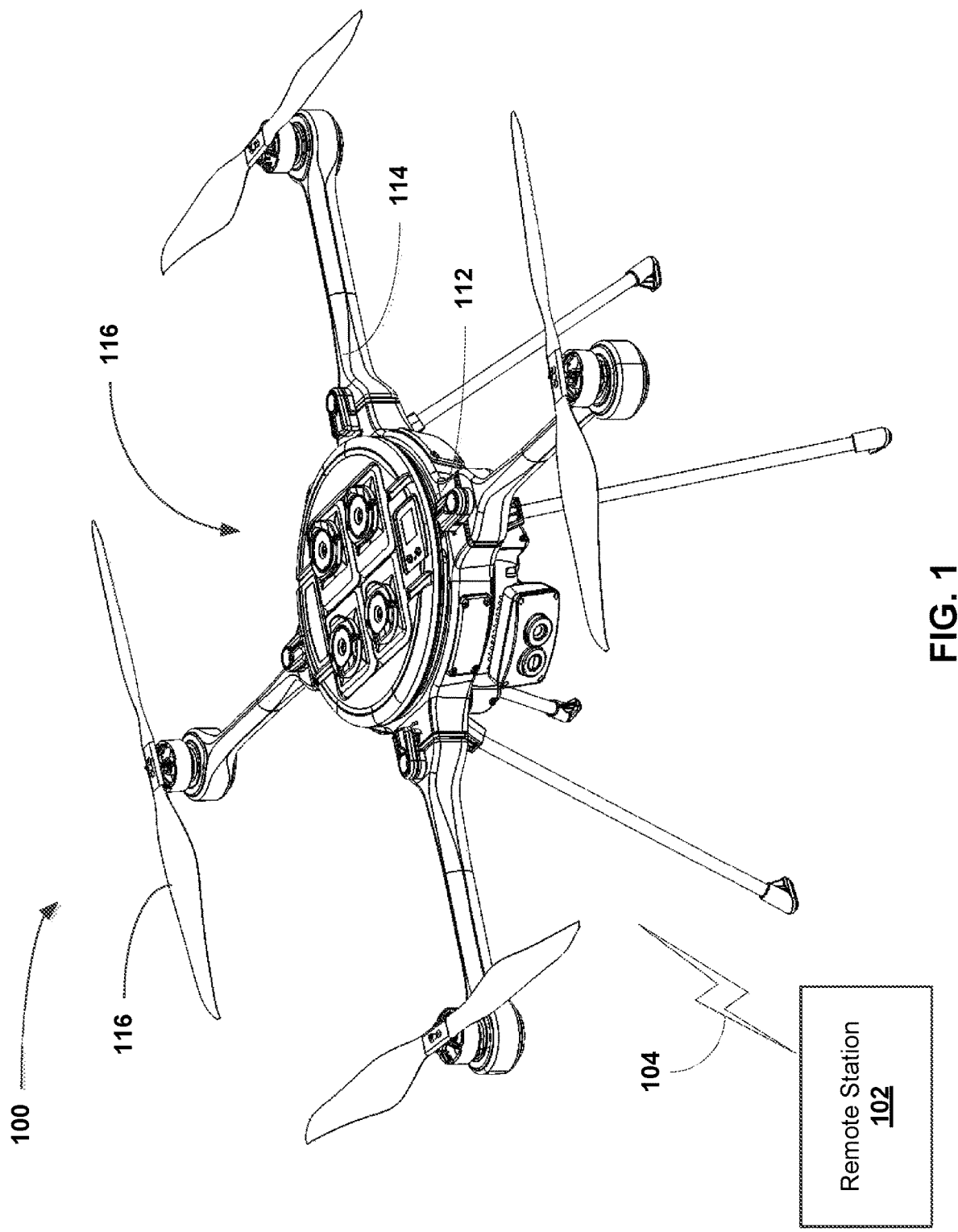
FIG. 1 illustrates an example of an unmanned system (US) comprising an unmanned vehicle (UV) and its associated system elements, in accordance with some embodiments.

FIG. 1 illustrates an example of an unmanned system (US) 100 (such as an unmanned aircraft system) comprising an unmanned vehicle (UV) 110 (such as an unmanned aerial vehicle) and its associated system elements, in accordance with some embodiments. The UV 110 may be designed to operate with no operator (or pilot) onboard. In the embodiment shown in FIG. 1, the unmanned system 100 includes a remote operator (or pilot) station 102 and command and control links 104 between the UV 110 and the remote operator (or pilot) station 102. The command and control links 104 may include any data link for the purposes of managing the movement (e.g., flight) of the UV 110. The UV 110 may operate autonomously without operator (or pilot) intervention in the management of the movement (e.g., flight) during the entire movement (e.g., flight) operation or a portion thereof. The unmanned system 100 may also include other system elements as may be required at any point during movement (e.g., flight) operation.

In some embodiments, UV 110 may be an unmanned aircraft (UA) or UAV as shown in FIG. 1.

The example UV 110 shown in FIG. 1 may include a body 112, arms 114 extending away from the body 112 to support components such as propellers 116, and legs 118 to support the body 112 when UV 110 is positioned on a surface. When not in use, a propeller may be in a folded position. It is understood that propellers 116 may be in the folded position during storage of the UV 110, while the open position is used during flight operation of the UV 110. Although four arms 114 and four legs 118 are illustrated in the embodiment shown in FIG. 1, it is understood that UV 110 may include any other number of arms 114 and legs 118. As noted above, the example of FIG. 1 pertains to a UAV by way of example only. Other types of UVs may also employ the teachings described herein.

In some embodiments, remote pilot (or operator) station 102 may comprise a ground station. In other embodiments, remote pilot (or operator) station 102 may comprise a client device acting as a control station. In still other embodiments, remote pilot (or operator) station 102 may comprise both a ground station and a client device.

Figure 2:
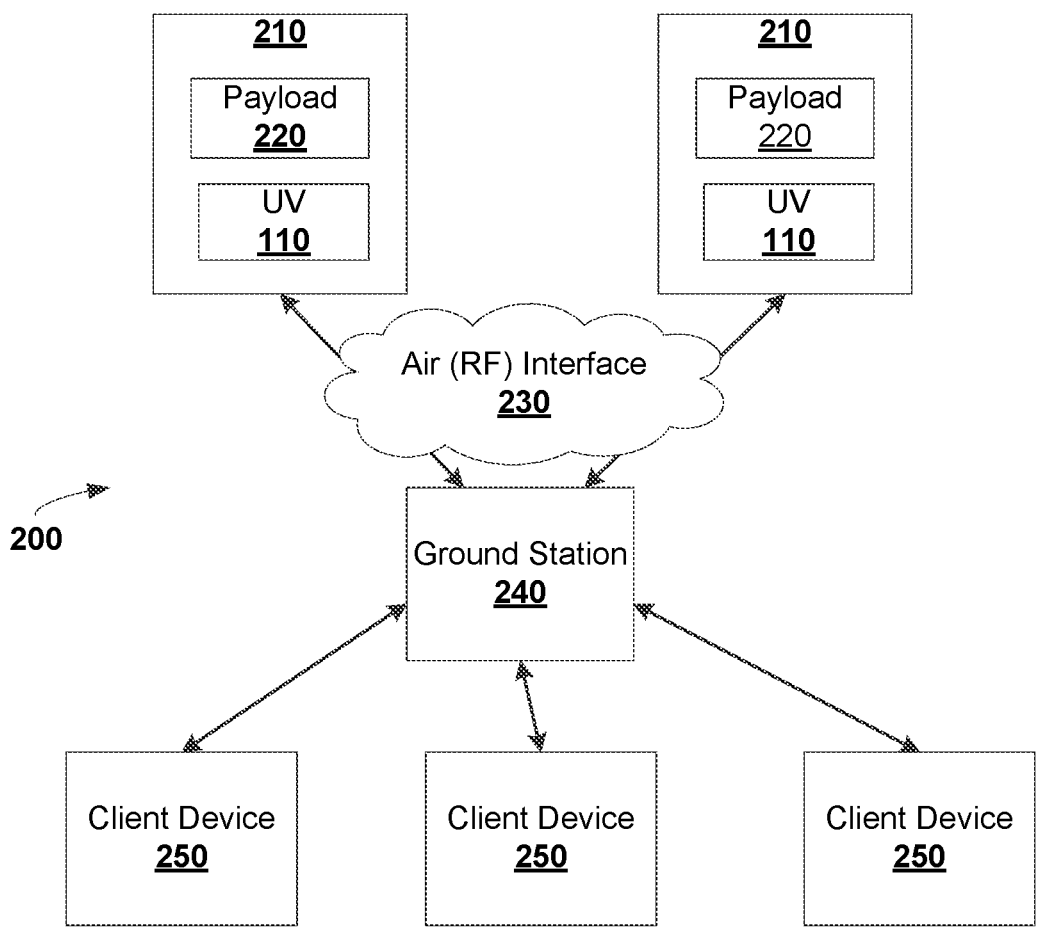
FIG. 2 illustrates, in a component diagram, an example of a US, in accordance with some embodiments.

FIG. 2 illustrates, in a component diagram, an example of a US 200, in accordance with some embodiments. The US 200 may include one or more loaded vehicles 210, a ground station 240, and one or more client devices 250. The US 200 may include more than one ground station 240. A loaded vehicle 210 may include a UV 110 and a payload 220. The ground station 240 may communicate with one or more loaded vehicles 210 via air interface 230 which may include satellite communication or other types of radio frequency communication between station 240 and loaded vehicles 210. The ground station 240 may communicate with one or more client devices 250 through a number of communication links and network interfaces, such as a wired or wireless local area network, a cellular network (such as global system for mobile (GSM) communication, long-term evolution (LTE), fifth generation (5G), or other cellular networks) or a proprietary or private radio link.

A loaded vehicle 210 may include a UV 110 and a payload 220. The payload 220 may include one or more of: a freight package, a camera, a measuring device, one or more sensors, and a storage device (e.g., a universal serial bus (USB) drive). A payload 220 can also include, for example, flame retardant for use in a forest fire. Generally speaking, a payload 220 may be any cargo or equipment a UV 110 carries that is not necessarily required for flight, control, movement, transportation and/or navigation of the UV 110 itself. A payload 220 may be attached or coupled to the UV 110 in a number of ways. For example, a payload 220 may be connected to the UV 110 by one or more interfaces such as an Ethernet connection, a controller area network (CAN) bus connection, a serial connection, an inter-integrated circuit ($I^2C$) connection, a printed circuit board (PCB) interface, a USB connection, a proprietary physical link, and so on.

The ground station 240 may be configured to communicate with one or more loaded vehicles 210 (or simply "vehicles 210" hereinafter). The ground station 240 may also communicate with UVs 110 not carrying any payload. The ground station 240 may control one or more loaded vehicles 210, one or more UVs 110, one or more payloads 220 concurrently in real-time or near real-time. The ground station 240 may also receive commands and/or data from one or more client devices 250, process the commands or data, and transmit the processed commands or data to one or more vehicles 210, UVs 110, or payloads 220. In some embodiments, the ground station 240 may receive user input directly at a user console (not shown) without client devices 250. In some embodiments, a client device 250 may be the user console for the ground station 240.

A client device 250 may serve to control the operation of one or more vehicles 210, UVs 110, or payloads 220 remotely. In some embodiments, a client device 250 may also be referred to as a control station. The client device 250 may be implemented as a computing device.

A user, such as an owner or operator of a UV 110, may use a client device 250 to communicate with, and to control, one or more vehicles 210, UAVs 110, or payloads 220. A client device 250 may have an application implemented for communicating with or controlling vehicles 210, UVs 110, or payloads 220. Such an application may be launched as a stand-alone process in an operation system, or within an Internet browser. The user may enter information through a user interface provided by the application. In addition, information relating to, or from, the vehicle 210, UV 110, or payload 220 may be displayed by the application on a display of client device 250. Client device 250 may communicate with, or control, vehicle 210, UV 110, or payload 220 through the ground station 240, or in some embodiments, client device 250 may communicate with, or control, vehicle 210, UV 110, or payload 220 directly without the ground station 240.

In some embodiments, the client device 250 is operable to register and authenticate users (using a login, unique identifier, biometric information or password for example) prior to providing access to loaded vehicles, payloads, UVs, applications, a local network, network resources, other networks and network security devices. The client device 250 may serve one user or multiple users.

In some embodiments, communication hardware and communication links may include a network interface to enable computing device to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others, including any combination of these.

Either or both of the ground station 240 and the client device 250 may be configured to control vehicle 210, UV 110, or payload 220. Flight control, navigation control, movement control, and other types of command signals may be transmitted to the UV 110 for controlling or navigating one or more of vehicle 210, UV 110, or payload 220. Command signals may include command data (e.g., coordinate information) required to execute flight control, movement control or navigation control of one or more of vehicle 210, UV 110, or payload 220.

Either or both of the ground station 240 and the client device 250 may be configured to receive data from one or more of vehicle 210, UV 110, or payload 220. For example, payload 220 may transmit data, including but not limited to, sensor data, audio, video or photographs to the ground station 240 or to the client device 250.

Figure 3:
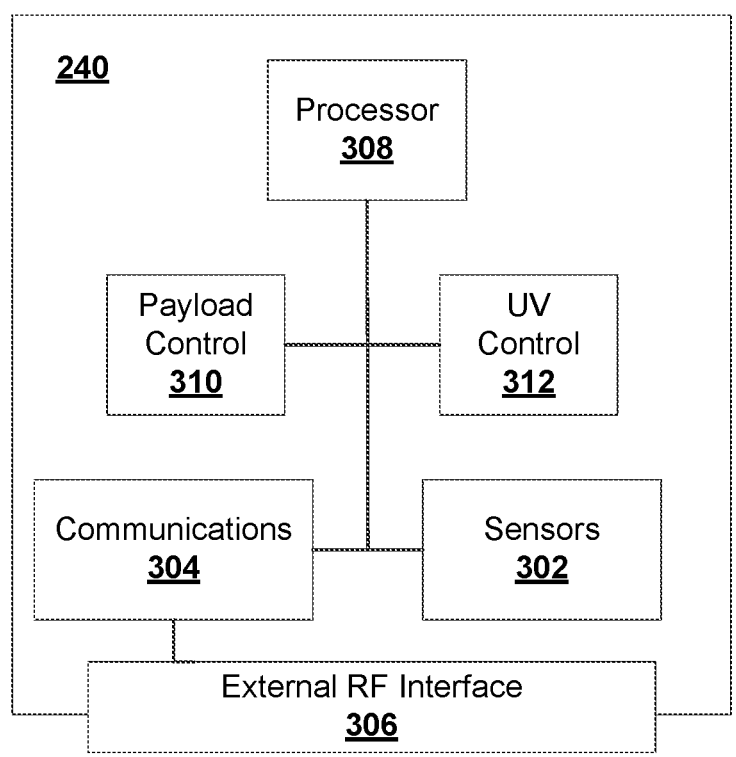
FIG. 3 illustrates, in a component diagram, an example of a ground station, in accordance with some embodiments.

FIG. 3 illustrates, in a component diagram, an example of a ground station 240, in accordance with some embodiments. The ground station 240 may include a sensor subsystem 302 (which may include a global positioning system (GPS) subsystem), a communications module 304 configured to process received data packets, and to prepare data packets for transmission through an external radio frequency (RF) interface 306, an external RF interface configured to communicate with an external RF interface on a UV 110, a processor or controller 308, a payload control module 310, and a UV control module 312. The sensor subsystem 302 may be used to acquire environmental data if the ground station 240 is proximate or near the UV 110, where the environmental data may be used for controlling the UV 110, the payload 220, or the loaded vehicle 210, such as location data, weather data, and so on. The payload control module 310 may generate command signals for controlling the payload 220, and the UV control module 312 may general command signals for controlling the UV 110. Both types of control commands may be processed by the communications module 304 and transmitted to the UV 110 and the payload 220 via external RF interface 306. The ground station 240 may also include an operator console (not shown) that includes a display (not shown) providing video feed from a camera payload on the UV 110. The embodiments described herein refer to a video feed from a camera. It should be understood that the same teachings apply to an image or video feed from the camera.

Figure 4:
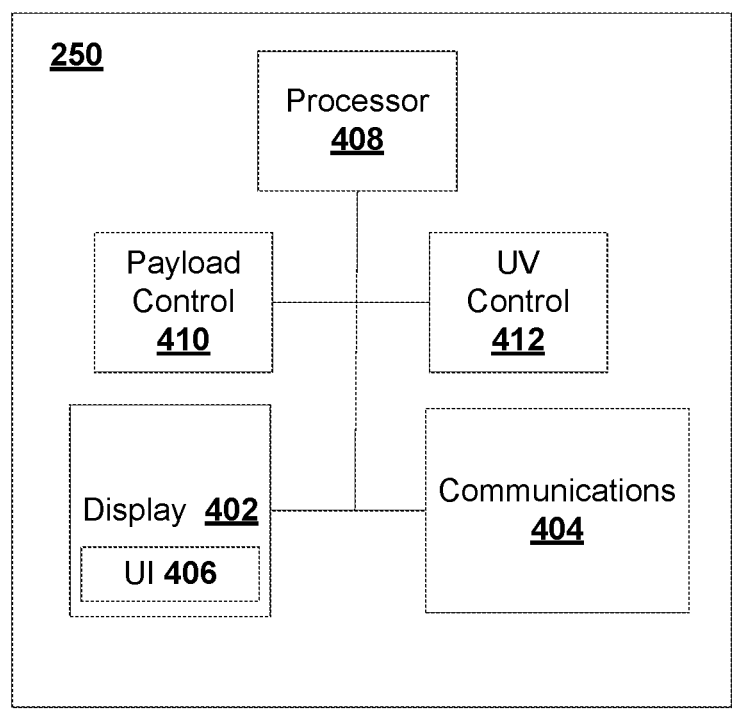
FIG. 4 illustrates, in a component diagram, an example of a client device, in accordance with some embodiments.

FIG. 4 illustrates, in a component diagram, an example of a client device 250, in accordance with some embodiments. The client device 250 may comprise a communications subsystem 404, a processor or central computer system 408 and a display 402. The communications subsystem 404 allows for seamless communications between the client device 250 and UV 110, seamless communications between the client device 250 and payload 220, and seamless communications between the client device 250 and each ground station 240, when ground stations 240 are used. The user interface (UI) 406 is generated by processor 408 for display on the display 402 of a client device 250, which remotely controls the UV 110, the payload 220, and/or the loaded vehicle 210 or as part of a control system for one or more vehicles 210. Display 402 may be a touch-screen display, or a non-touch display. In some embodiments, client device 250 may be on a single-unit computer (e.g., one with a built-in display), or a multi-unit computer (e.g., with a separate display). The payload control module 410 may generate command signals for controlling the payload 220, and the UV control module 412 may general command signals for controlling UV 110. Both types of control commands may be processed by communications module 404 and transmitted to the UV 110 and the payload 220 via the ground station 240.

The client device 250 is configured to display at least a subset of the received vehicle status data for each UV 110 or payload 220 in an interface (such as UI 406, for example). A display 402 may provide a graphical representation of the respective vehicle location data of each of the vehicles 110. Through the interface 406, the client device 250 may receive control command input. The control command input is associated with one of the UV 110 having its vehicle status data displayed in the interface 406. The client device 250 may then transmit the received control command, or a command derived therefrom, to the UV 110. The interface 406 may enable a user to view status and control operation of each of one or more UVs 110 such that the location of each UV 110 is shown in the interface 406, and each UV 110 may be independently controlled through the interface 406 by selecting a particular one of the UV 110 to control. In this way, multiple UV 110 may be monitored and controlled through an interface 406 at the client device 250.

Further detail on the controlling UVs 110 using interface 406 is provided in PCT Application No. PCT/CA2013/000442 entitled "System and Method for Controlling Unmanned Aerial Vehicles", the entire contents of which are hereby incorporated by reference. Client device or control station 250 may control interface panels to display a location of the UV 110.

Figure 5:
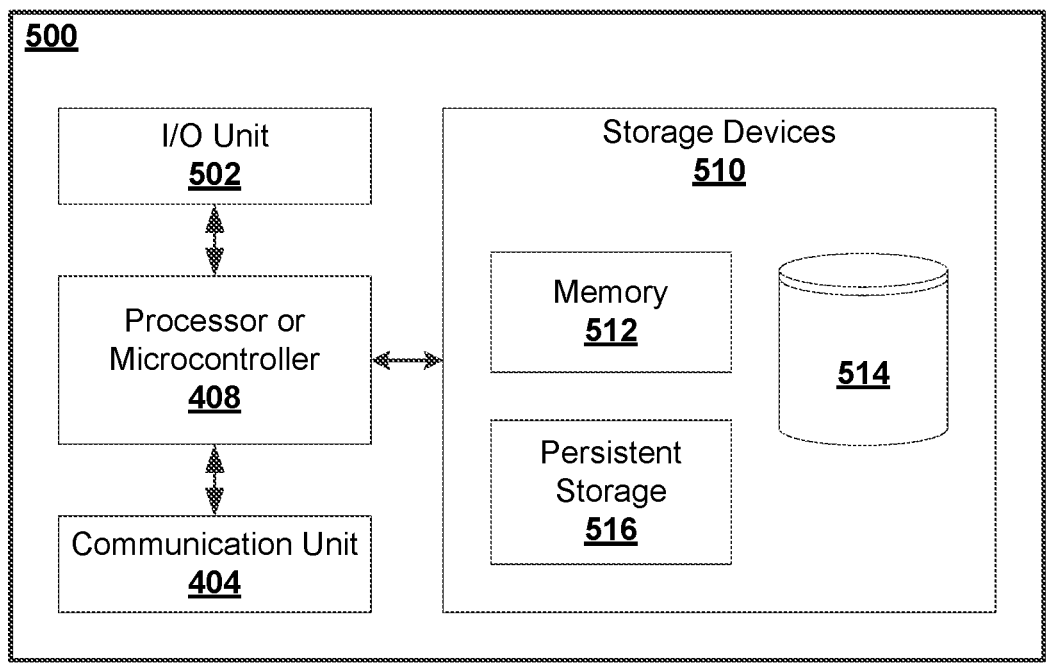
FIG. 5 illustrates, in a component diagram, an example of a control station, in accordance with some embodiments.

FIG. 5 illustrates, in a component diagram, an example of a control station 500, in accordance with some embodiments. The control station 500 may be a client device 250, and/or a ground station 240 having a display, and/or a remote pilot station 102. In some embodiments, the control station 500 may be implemented on a tablet, phone, computer, purpose-built control station or other capable device or system. A processor or controller 408 can execute instructions in memory 512 to configure the communications module 404, the payload control module 410 and the UV control module 412. A processor 408 can be, for example, any type of general-purpose microprocessor or microcontroller, a digital signal processing (DSP) processor, an integrated circuit, a field programmable gate array (FPGA), a reconfigurable processor, or any combination thereof.

Memory 512 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Storage devices 510 include memory 512, databases 514, and persistent storage 516.

Each I/O unit 502 enables the control station 500 to interconnect with one or more input devices, such as a keyboard, mouse, camera, touch screen and a microphone, or with one or more output devices, such as a display screen 402 and a speaker. The discussion below will focus on a camera (payload) as an input device and a display 402 as the output device. As will be further described below, UV 110 telemetry readings will also be used as input.

Each communication unit or interface 404 enables the control station 500 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others, including any combination of these. For example, a communication interface 506 may include an Ethernet connection to the ground station 240, or a wireless communication interface operable to communicate with ground station 240. In some embodiments, the communication interface 404 may include a RF interface operable to communicate with the UV 110.

Figure 6:
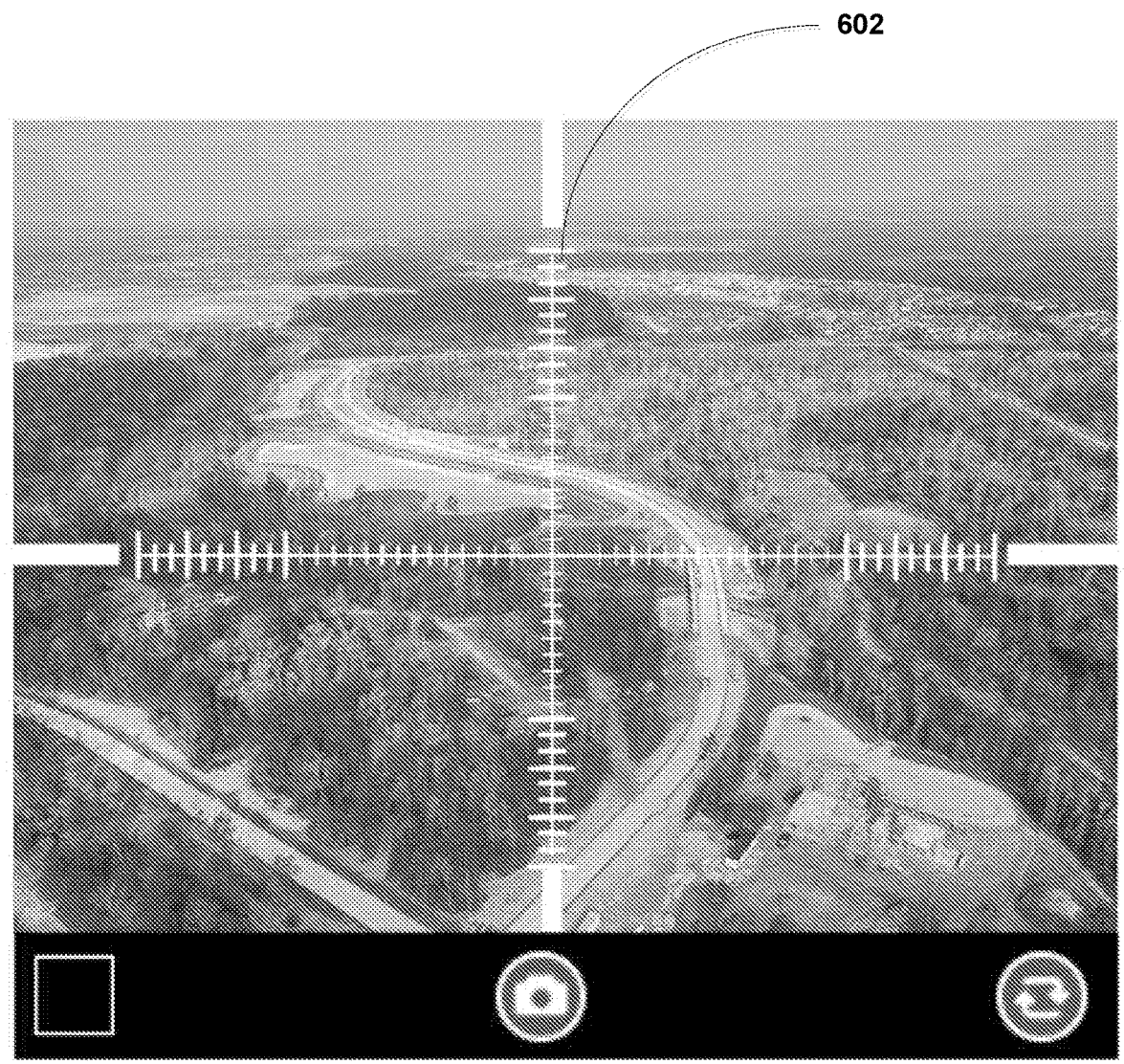
FIG. 6 illustrates, in a screenshot, an example of a grid overlay on a video feed, in accordance with some embodiments.

In some embodiments, the UI 406 in a control station 500 (and/or a UI implemented in a ground station 240 having a display; and/or a UI implemented in a remote pilot station 102 having a display) may compute and display an overlay on top of a video feed from a UV 110. In some embodiments, the overlay may comprise a grid showing equivalent distances on the ground. FIG. 6 illustrates, in a screenshot, an example of a grid overlay 602 on a video feed, in accordance with some embodiments. The grid overlay 602 is a milliradian (mRad) overlay comprising a static image with specific characteristics that an observer may then use to mathematically approximate sizes and distances. Other features may be implemented to allow the use of UI elements to calculate linear distances on the ground, drive, fly, move and/or navigate the UV 110 through telemetry information in the absence of a video feed, show navigational features on the grid, and calculate/calibrate errors in the GPS.

In some embodiments, it is desirable for a UV 110 with video capability to providing ranging information to the operator of the UV 110 from a video pane in the display 402. Ranging is the ability to show distances (ranges)—either distances between objects on the screen, or distances from the UV 110 to a point or object. It is also desirable to allow operators in other mission scenarios to measure objects and terrain, determine if a vehicle can get through a gap in structures or obstacles, and measure the speed of an object.

Figure 7:
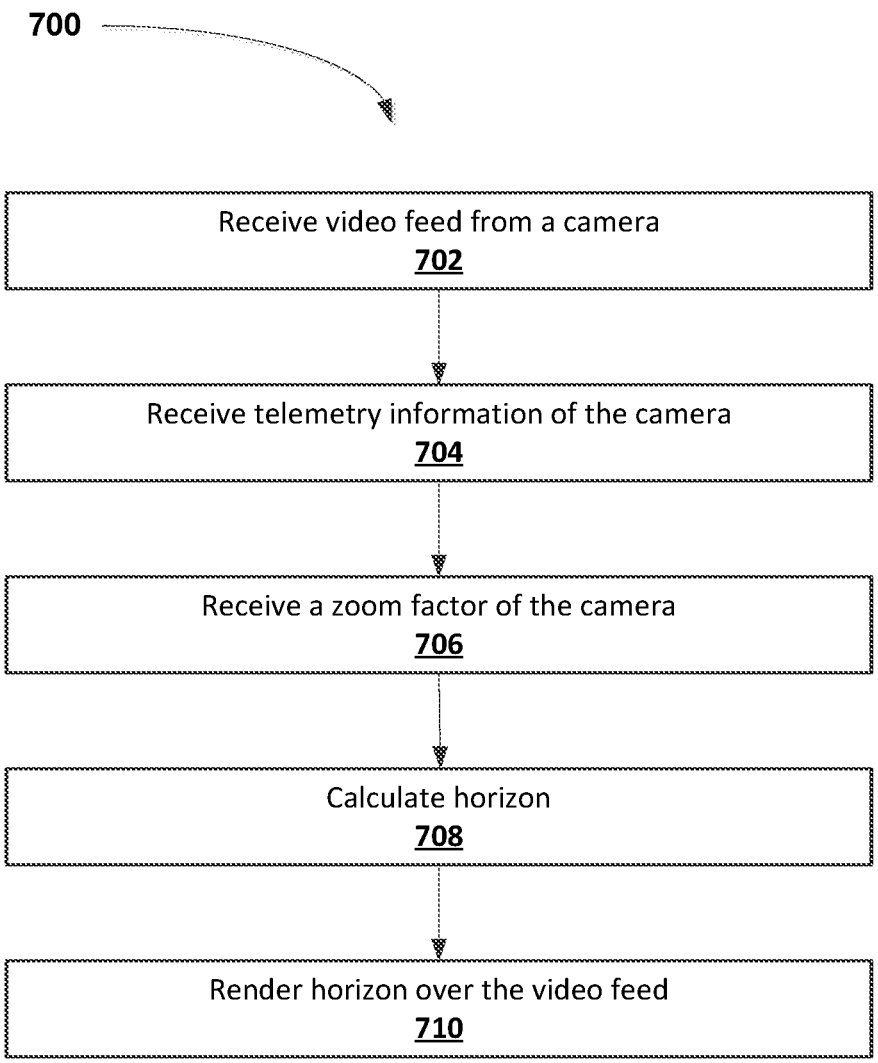
FIG. 7 illustrates, in a flowchart, an example of a method of rendering a ground plane over video feed, in accordance with some embodiments.

FIG. 7 illustrates, in a flowchart, an example of a method 700 of rendering a ground plane over video feed, in accordance with some embodiments. The method may be performed by the control station 700, and comprises receiving 702 a video feed from a camera on a UV 110, receiving 704 from the UV telemetry information of the camera, receiving 706 from the camera a zoom factor of the camera, calculating 708 a horizon of the camera, and rendering 710 the horizon as an overlay image on the video feed. In some embodiments, the telemetry information of the camera includes, but is not limited to, a location position, an orientation position, an altitude, and any other data used to calculate a horizon. In some embodiments, the telemetry information of the camera may be identical or similar to the telemetry information of the UV 100. It should be understood that steps 702, 704 and 706 may be performed in any order. A UV 110 may be equipped with a video camera as a payload 220, which streams video back to a control station 500. The control station 500 may display and/or store this video feed that it receives 702 from the camera. The UV 110 may consistently report its location and orientation and the direction/angle of view of the camera to the control station 500. The control station 500 and/or the ground station 240 may also know the field of view of the camera. This field of view may be hard-coded in the control station storage 510 or transmitted by the UV 110 at some point, along with the current zoom factor of the camera. In some embodiments, the zoom factor of the camera and the location and orientation of the UV 110 may be acquired some time before step 702 and stored in a cache. The ground station 240 may then calculate a horizon for the camera based upon the telemetry information of the UV 110 and the field of view and zoom factor of the camera. One algorithm that may be used to calculate the horizon is called H-COV-LUM. It operates on the principle that if an image is divided into two regions with a line, and then the variance of luminance is calculated for each region (on either side of the line), then the horizon is the line that minimizes the sum of those two variances. There are other algorithms for calculating the horizon. The calculated horizon may then be rendered as an overlay image on top of the video image in the display 402. Thus, the method 700 calculates and renders a ground plane based on telemetry information from the UV 110.

Figure 8:
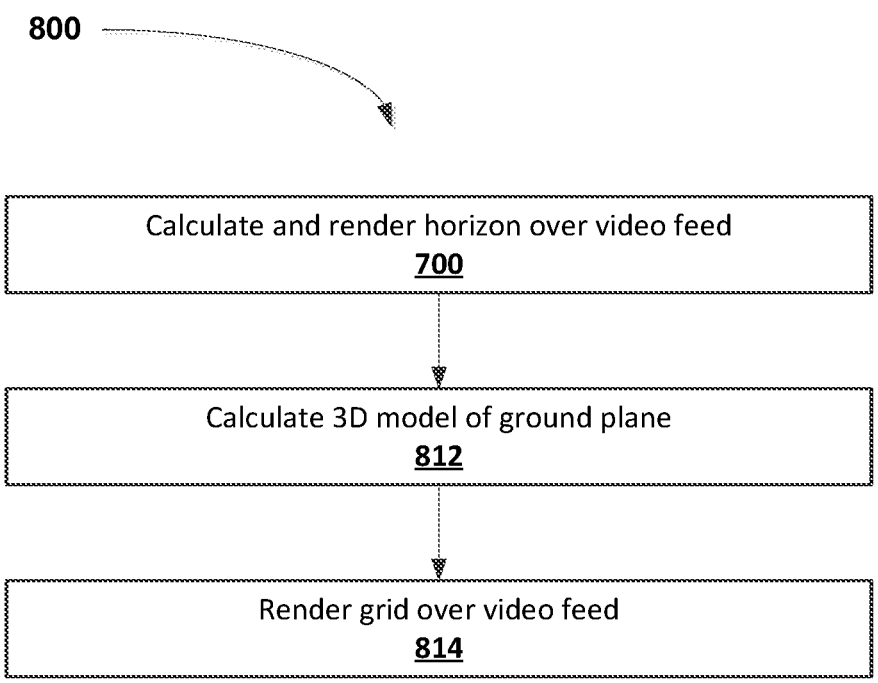
FIG. 8 illustrates, in a flow chart, another method of rendering a ground plane, in accordance with some embodiments.
Figure 9:
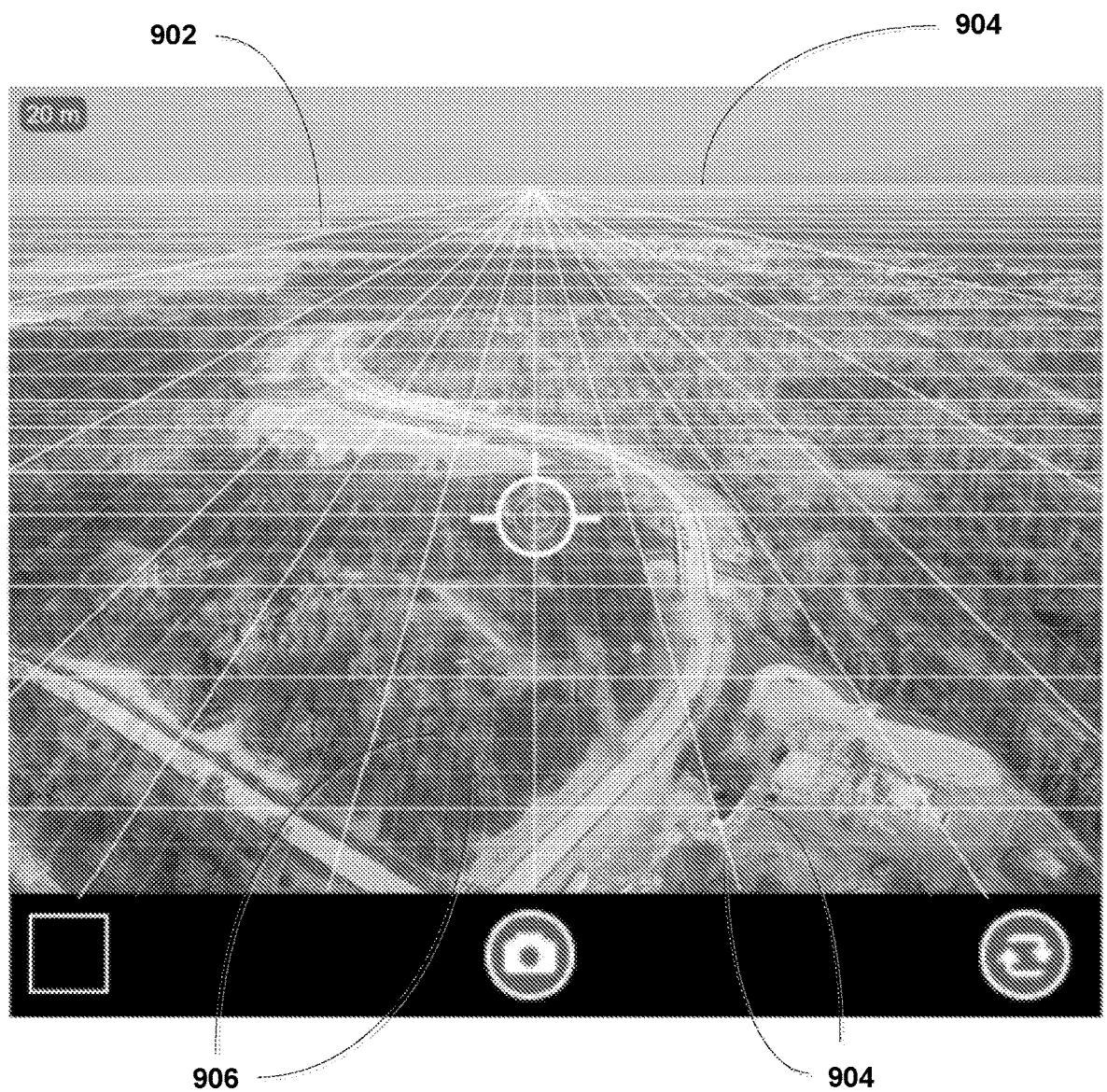
FIG. 9 illustrates, in a screenshot, an example of a rectangular grid, in accordance with some embodiments.
Figure 10:
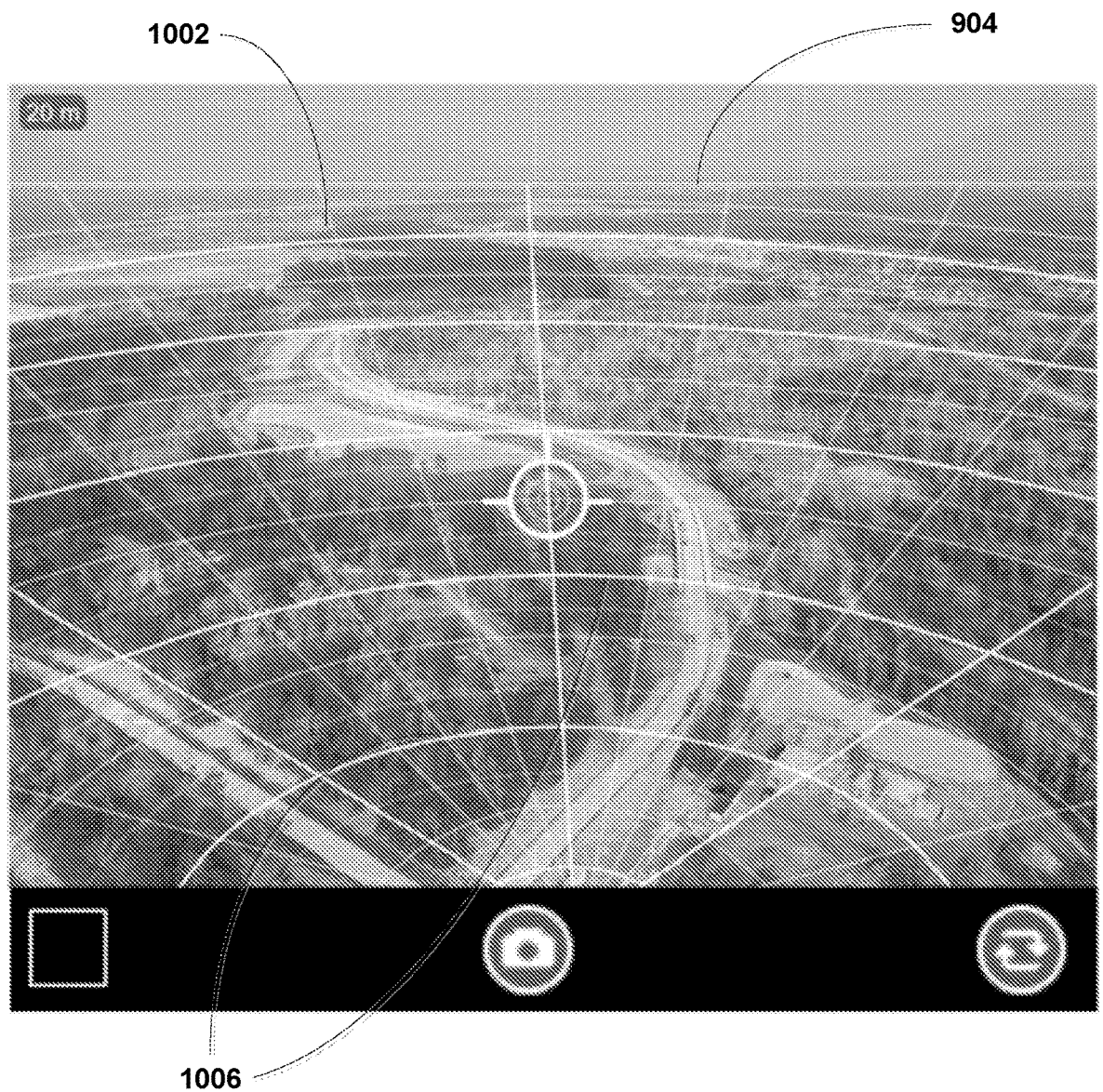
FIG. 10 illustrates, in a screenshot, an example of a radial grid overlay on a video feed, in accordance with some embodiments.

FIG. 8 illustrates, in a flow chart, another method 800 of rendering a ground plane, in accordance with some embodiments. The method 800 comprises the method 700, calculating 812 a three dimensional (3D) model of the ground plane, and rendering 814 a grid as an overlay image on the video feed. The grid may shows equal distances at ground level. As shown in FIG. 6, the grid 602 may be an mRad grid. FIG. 9 illustrates, in a screenshot, an example of a rectangular grid 902, in accordance with some embodiments, stretching from the bottom of the field of view out to the horizon 904. The user can then observe ground distances from this grid by viewing the image overlaid over the video feed on the display 402. The grid 902 is rectangular and made of major grids 906 where each major grid 906 is sub-divided into a minor grid 908. The grid 902 spacing details may be calculated dynamically (e.g., based on the distance to the ground of the camera) or may be predetermined and selected in a user setting. The grid may alternatively be a radial grid. FIG. 10 illustrates, in a screenshot, an example of a radial grid overlay 1002 on a video feed, in accordance with some embodiments. The radial grid 1002 also allows for the communication of angular direction. Major angular grid lines 1006 may be rendered at 40 or 30 increments for ease of presentation and readability for the observer. The remainder of this description will focus on the rectangular grid 902 format. However, it should be understood that the teachings may be modified to apply to the radial grid 1002 format.

The user may adjust the location of the horizon in the UI 406, to account for weather-induced telemetry issues or other inaccuracies in the telemetry information. Alternatively, the ground station 240 and/or the UV 110 may sense these inaccuracies in the video feed (for instance, by algorithmically examining the video feed for a horizon line) and account for them. Once the location of the horizon is changed, the horizon rendering may be modified accordingly. Moreover, the grid 902, 1002 may be recalculated based on the new location of the horizon and re-rendered accordingly.

Figure 11:
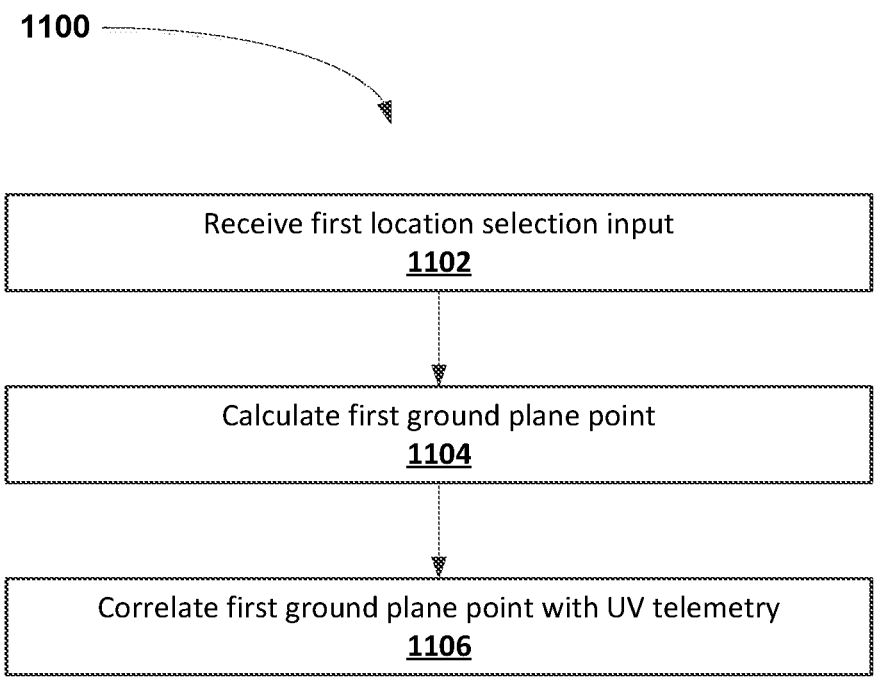
FIG. 11 illustrates, in a flowchart, an example of a method of determining a ground plane point, in accordance with some embodiments.

FIG. 11 illustrates, in a flowchart, an example of a method 1100 of determining a ground plane point, in accordance with some embodiments. The user may use a UI element (such as a clicking with a tablet stylus or mouse) to select a point on the grid 902, 1002. The control station 500 receives 1102 this point (i.e., first location selection input associated with a first point on a video feed), calculates 1104 where on the ground plane this point would lie (i.e., a first ground plane point associated with the first video feed point), and correlate 1106 the first ground plane point with the telemetry information received from the UV 110, resulting in GPS co-ordinates of a first point on the ground corresponding to the point that the user selected (i.e., associated with the first video feed point). The control station 500 may also calculate the ground distance from this point to the UV 110, the distance from this point to a home base or other known point, an estimated time to drive to, navigate to, fly to above, or otherwise move to this point, or other navigational or cartographic information about this point. Any of this information may be displayed by the control station 500.

Figure 12:
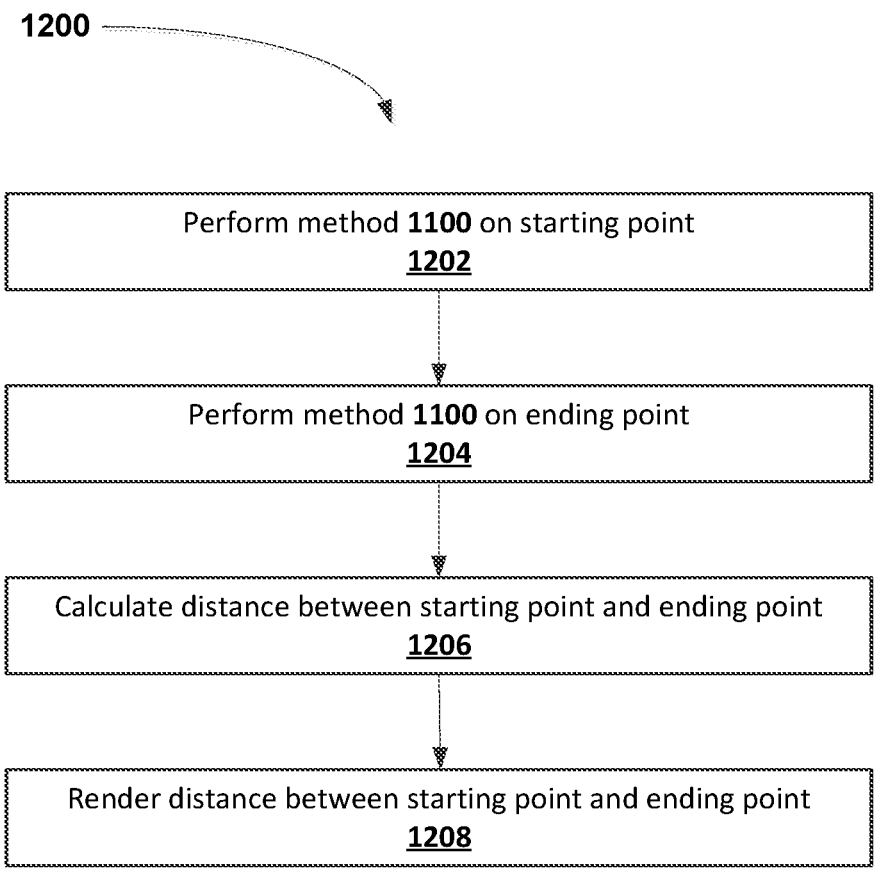
FIG. 12 illustrates, in a flowchart, an example of a method of determining a distance between two point, in accordance with some embodiments.
Figure 13:
FIG. 13 illustrates, in a screenshot, an example of a rendering of the example of FIG. 12 on a rectangular grid, in accordance with some embodiments.
Figure 14:
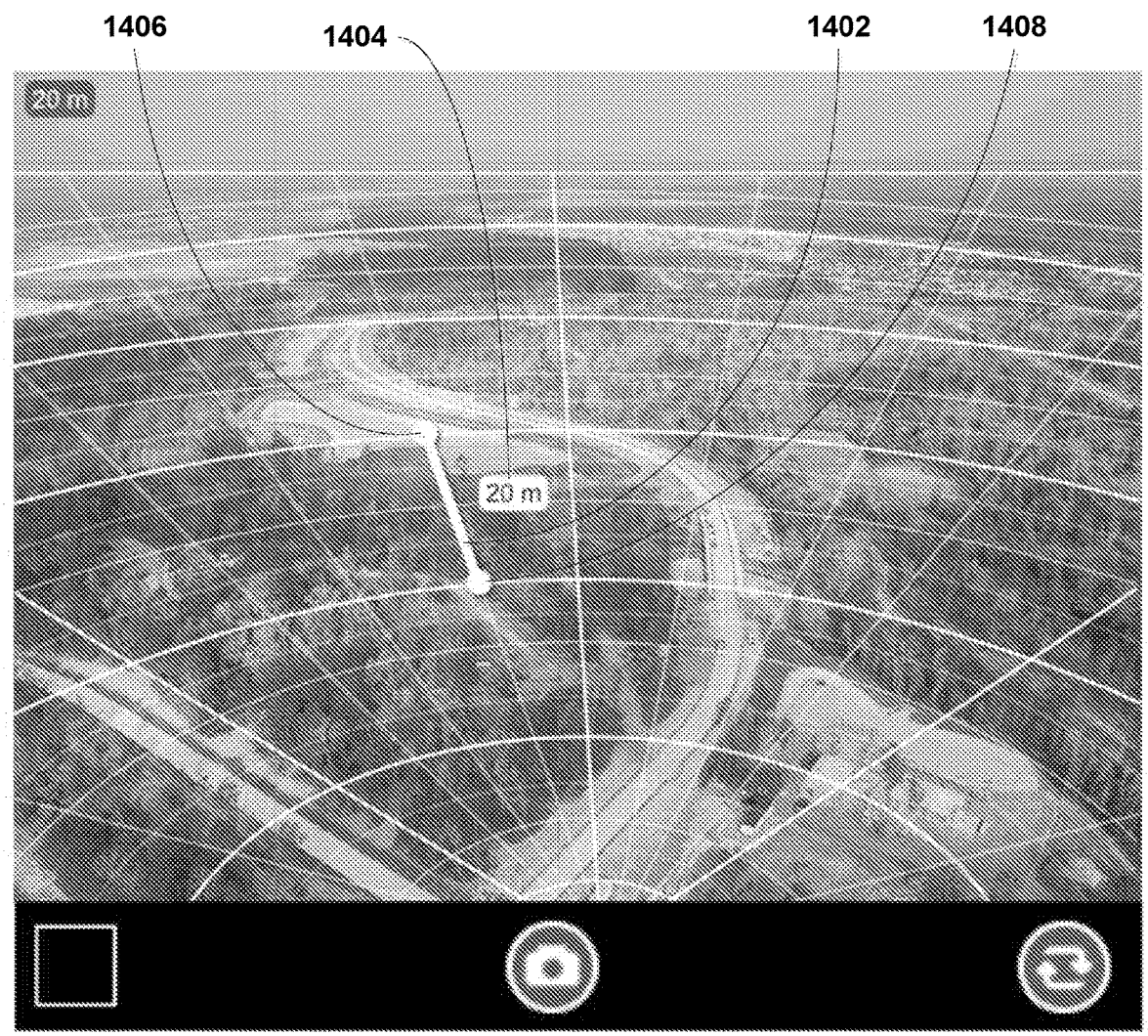
FIG. 14 illustrates, in a screenshot, another example of a rendering of the example of FIG. 12 on a radial grid, in accordance with some embodiments.

FIG. 12 illustrates, in a flowchart, an example of a method 1200 of determining a distance between two point, in accordance with some embodiments. A user may use a UI element (such as drawing a line with a stylus or clicking and dragging with a mouse) to draw a line on the grid 902. The control station 500 can calculate the starting and ending points of this line, using the method of FIG. 11 described above. I.e., method 1100 may be performed 1202 on the starting point, and method 1100 may be performed 1204 on the ending point. Next, the distance between the ground level starting and ending points may be calculated 1206, and rendered 1208 on the display 402. Ancillary information, such as estimate navigation, transportation, movement or flight time between these points, may also be rendered. FIG. 13 illustrates, in a screenshot, an example of a rendering of the line 1302 and calculated distance 1304 between the endpoints 1306, 1308 on a rectangular grid 902, in accordance with some embodiments. FIG. 14 illustrates, in a screenshot, another example of a rendering of the line 1402 and calculated distance 1404 between the endpoints 1406, 1408 on a radial grid 1002, in accordance with some embodiments.

As the zoom factor on the UV 110 camera changes (whether autonomously or from user control), the UV 110 may send back updates on the current zoom factor. The control station 500 may recalculate the location of the horizon 904 and the layout of the grid 902, 1002. These recalculations may be dynamically updated on the UI 406 as the zoom factor changes so that the overlay matches the video.

In some embodiments, it is desirable to see how much of a footprint a UV 110 would occupy at a certain location in the video image, e.g., how large the UV 110 would be if it were 100 metres (or any other distance) ahead of its current location. This is useful for determining whether the UV 110 would fit into an opening which can be seen in the video image.

To facilitate this, the overlay may have a feature where the user may specify a location for the UV 110 (either an absolute location or a location relative to the UV's current position), and the UI 406 will show a representation of the UV 110 (or a box which approximates the size of the UV 110) at that location in the video image.

Figure 15:
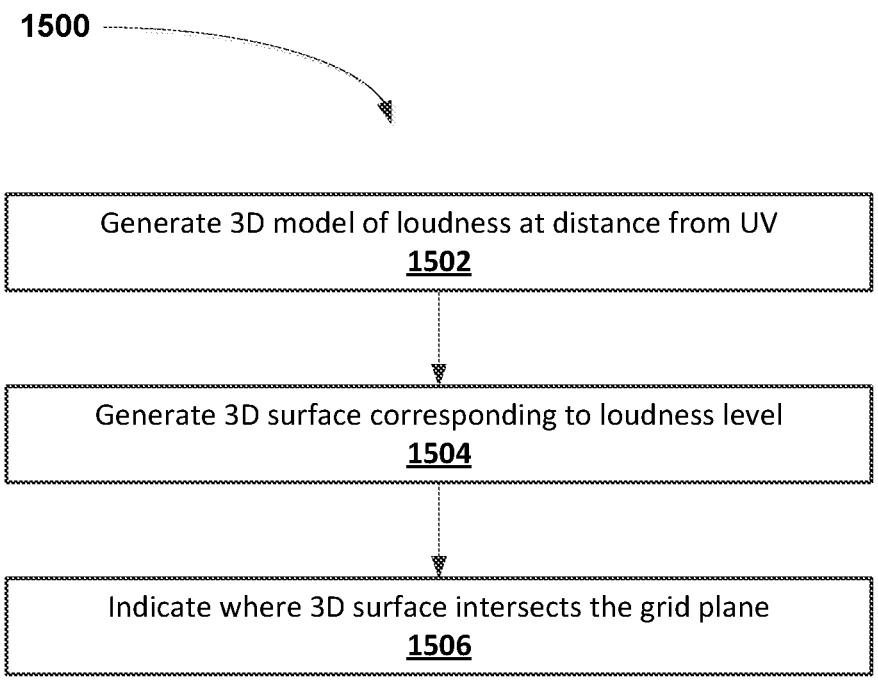
FIG. 15 illustrates, in a flowchart, an example of a method of rendering an audibility model surface, in accordance with some embodiments.

In some embodiments, it is desirable to see what regions can likely hear the UV 110 at any given time. This may be used in stealth operations, but may have other applications, such as abiding by noise bylaws. FIG. 15 illustrates, in a flowchart, an example of a method 1500 of rendering audibility model surface, in accordance with some embodiments. A control station 500 may perform the method 1500 by using an audibility model of a known level of loudness for the UV 110. For example, the UV 110 may be known to emit an audial sound (e.g., due to the vibration of the motor, etc.) at a specific level that is audible at a corresponding radius from the UV 110. In some embodiments, a plurality of audial sound levels to distance radius may be known. The control station 500 may generate 1502 a 3D model of the loudness at a given distances from the UV 110 (assuming a constant attenuation of the loudness with distance from the UV 110), generate 1504 a 3D surface (e.g., a sphere) corresponding to a specific level of loudness, and then indicate where that surface intersects with the ground (or other) plane. For example, the control station 500 may render on the display 402 where the surface intersects the grid 902, 1002 plane.

Enhancements to this process may include real-time loudness measurements (instead of a single hard-coded value for loudness), accounting for wind when calculating the attenuation of the loudness with distance, accounting for surface reflections, and accounting for the nature of the local ground cover (i.e., trees attenuate more than open air). An operator may use the audibility model calculations to pilot the UV 110 such that it is flying above a distance from the ground or another plane. Such distance being the minimum distance so that the UV 110 does not emit a sound above a loudness threshold.

An observer overlay 902, 1002 allows for piloting the UV 110 much more accurately than with just video alone. For more accurate navigation, since the calculations of the grid 902, 1002 use a generation of a 3D model of the navigational area and ground plane, navigational features such as waypoints, targets, no-fly zones, or other elements, may be plotted on the grid 902, 1002 as part of the overlay. The UI 406 may have controls for turning these elements on and off on the display 402. As with the point/line selection discussed above, the UI 406 may allow for the calculation of distances between selected points and navigational elements.

Sometimes, video is not available, but telemetry information (GPS, compass, altimeter, roll/pitch/yaw measurements, etc.) may still be available. This can happen when the UV 110 is a long distance from the control station 500 (or from an intermediate ground station 240 that may be relaying communications). For example, the high-reliability/low-speed control/telemetry link may still be reliable between the UV 110 and the control station 500, but the less reliable, high-speed video channel may be too lossy for usable video. In this case, the control station 500 may allow the user to fly, navigate, drive or otherwise move the UV 110 using only the overlay (without a background, or with intermittent still images).

In some embodiments, as a result of weather or other issues, GPS, compass or other telemetry information may become increasingly inaccurate or may be unavailable. If the telemetry information is not available, the control station 500 may take action. In some embodiments, the control station 500 may use the last available telemetry values to calculate the grid 902, 1002 (i.e., not update the grid). This method may be used when the telemetry outages are brief or when the UV 110 continues operating as it was doing before the telemetry information became unavailable. In some embodiments, if there is a video stream present, the control station 500 may examine frame-to-frame changes to calculate an updated grid 902, 1002. In some embodiments, the control station 500 may display an indication that the overlay may not be accurate. In some embodiments, the control station 500 may disable the overlay feature. The control station may take these actions based on a score calculated by the presence or absence of various pieces of telemetry information, or their perceived accuracy. One example of calculating telemetry inaccuracies is to track changes in the orientation reported by a compass—in the absence of controlling the UV 110 to change its orientation. The variance of the reported orientations taken over a certain period should not exceed a threshold. An unreliability score for the compass may be calculated by subtracting this variance from the threshold.

If topographical information for the area being displayed is available from a stored or online source of terrain data (e.g., digital terrain elevation data (DTED), Google Maps, etc.), the ground contours may be calculated from the camera's perspective and may be incorporated into the 3D model of the ground plane. This would allow for more accurate ground-level distance calculations and more accurate mapping when the terrain is uneven or when the ground is sloping.

If an object of a known size is present in the video image, the user may be able to draw a line on the overlay (as noted above), but rather than have the UI 406 report the distance between the endpoints of the line, the user specifies that distance through the UI 406. This may allow the recalculation/recalibration of the overlay grid 902, 1002 with this new information. The calculated values of the distances in the grid 902, 1002 may be re-adjusted to align the calculations with the empirical value that is being provided. For example, the calculation of the grid 902, 1002 may indicate a distance of 1030 metres (m) (or any other distance) between two points. However, if the user knows that this distance is precisely 1000 m, they may draw a line between the two points on the display and specify that the grid 902, 1002 be recalculated to show this distance as 1000 m. The calculations could be worked backwards to provide new grid coefficients, or the values could be iteratively changed until the grid 902, 1002 lines up with the newly-provided data.

The overlay 902, 1002 as discussed above may be a rendering of the ground plane from the perspective of the UV 110, meaning that distances and lines drawn on this overlay 902, 1002 are all as though they were at ground level. While this is useful for many applications, there are situations where a navigational plane other than the ground plane may be desired. For example, if the UV 110 is flying in a heavily treed area or in an urban environment with many buildings, it may be desired to plot a plane at the altitude of the tree canopy or of the local rooftops. This would allow for the user to see distances at an altitude corresponding to the visual features they are seeing in the video.

Since a 3D model is created to be able to plot the ground plane, another plane at an arbitrary altitude may be calculated and plotted from the same information set. Multiple altitude planes may be specified and displayed, differentiated by color or another UI characteristic.

In some embodiments, the UV 110 itself may calculate the overlay 902, 1002 and transmit it within the video stream. In some embodiments, the UV 110 or an intermediate ground station 240 may perform some of the calculations necessary for the overlay, with the final calculations and display performed by the control station 500.

While this discussion has focused on video transmissions and viewing on the ground station 240, the same features may be accommodated on static images, or periodically-updated still images, sent back from a video or still camera.

In some embodiments, the overlay 902, 1002 may be used to determine the distance between objects or points in the video feed, including between the UV and another UV, or between other UVs.

In some embodiments, the UV 110 may be a UAV that calculates the overlay 902, 1002 during flight or rest of the UAV. The overlay 902, 1002 during flight may be used to determine the dimensions of a confined area and, with knowledge of the dimensions of the UAV (either stored or obtained), determine if the UAV may fit within the confined area. In some embodiments, the dimensions of the confined area may be used to determine if another vehicle or structure (with stored or obtained knowledge of the dimensions) may fit within the confined area. In some embodiments, the observer overlay of a UAV may be used to assist with the navigation of another UV (e.g., a UGV).

In some embodiments, the UV 110 may be a UGV that calculates the overlay 902, 1002 during movement or rest of the UGV. During movement or rest, the UGV may determine if it may fit within an upcoming a confined space. Such determination may take place when the UGV is at the same plane as the confined space, or of the UGV is an a higher altitude looking down upon an area to determine if the UGV may navigate in that area.

In some embodiments, the UV 110 may be a unmanned aquatic vessel that calculates the overlay 902, 1002 during navigation or rest of the vessel. The observer overlay system may determine if the vessel may fit within an upcoming confined space, or how large are waves in the distance approaching the vessel.

Other UVs or structures may employ an observer overlay system. In some embodiments, a fixed and/or robotic structure having a camera may employ an observer overlay system. In some embodiments, the camera may be affixed or coupled to the fixed and/or robotic structure or on an arm or other sub element of the fixed and/or robotic structure. The fixed and/or robotic structure, sub element or camera may be configured to rotate or otherwise move such that the camera may obtain different views of images and/or video. In some embodiments, a security zone may employ one or more cameras on one or more fixed and/or robotic structures to calculate the overlay 902, 1002 to determine the speed, distance, and other measurements between objects within the camera's field of view of the zone.

Figure 16:
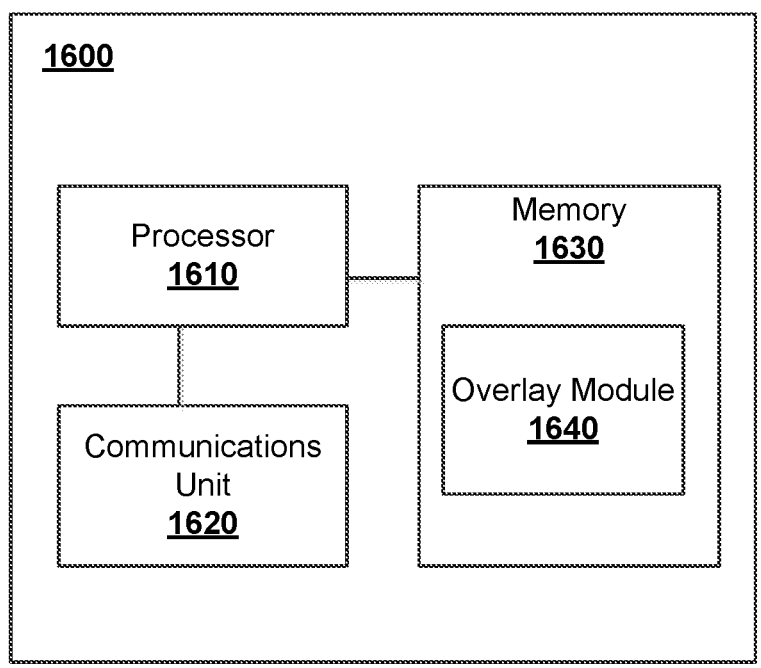
FIG. 16 illustrates, in a component diagram, an example of an observer overlay system, in accordance with some embodiments.

FIG. 16 illustrates, in component diagram, an example of an observer overlay system 1600, in accordance with some embodiments. The observer overlay system 1600 comprises a processor 1610 for processing operating instructions, a communications unit 1620 for receiving images and/or video feed from a camera, a memory 1630 that stores operating instructions for the observer overlay system 1600, and an overlay module 1640 for calculating an overlay 902, 1002 of the view of the images and/or video feed. Other components may be added to the observer overlay system 1600, including one or more cameras and one or more UVs.

The processor 1610 may be configured to perform many of the methods described above. For example, the processor 1610 may be configured to receive an image or video feed from the camera, receive from the camera telemetry information, receive from the camera a zoom factor of the camera, calculate a horizon of the camera; and render the horizon as an overlay image on the image or video feed. In some embodiments, the telemetry information of the camera includes, but is not limited to, a location position, an orientation position, an altitude, and any other data used to calculate a horizon. In some embodiments, the telemetry information of the camera may be identical or similar to the telemetry information of an object (such as, but not limited to, the UV 100) to which the camera is coupled.

The embodiments of the devices, systems and processes described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references may be made regarding control and computing devices. It should be appreciated that the use of such terms may represent one or more computing devices having at least one processor configured to execute software instructions stored on a computer readable tangible, non-transitory medium. For example, a remote station 102, 240, 250, 500 may have a server that includes one or more computers coupled to a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product instructing physical operations, such as controlling movement of the UV 110, for example. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the processes provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and processes implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The processor or controller 308, 408, ground station 240, or client device 250, 500 may be implemented as a computing device with at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

For example, and without limitation, the computing device may be a server, network appliance, microelectromechanical systems (MEMS) or micro-size mechanical devices, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the processes described herein.

A processor may be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

Data storage device may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Computing device may include an I/O interface to enable computing device to interconnect with one or more input devices, such as a keyboard, mouse, camera, touch screen and a microphone, or with one or more output devices such as a display screen and a speaker.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, processes and steps described in the specification. As one of ordinary skill in the art will readily appreciate from the disclosure of the present invention, processes, machines, manufacture, compositions of matter, means, processes, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, processes, or steps.

As can be understood, the examples described above and illustrated are intended to be exemplary only. The scope is indicated by the appended claims.

The invention claimed is:

1. An unmanned vehicle (UV) controller comprising:
a processor;
a communication interface for communicating with an unmanned vehicle (UV); and
a non-transitory memory device storing machine-readable instructions that, when executed by the processor, causes the processor to render a ground plane over images or video feed, the processor configured to:
receive an image or video feed from a camera on the UV;
receive from the UV telemetry information of the camera;
receive from the camera a zoom factor of the camera;
calculate a horizon of the camera based upon the telemetry information and the zoom factor; and
render the horizon as an overlay image on the image or video feed.

2. The UV controller as claimed in claim 1, wherein the processor is further configured to at least one of:
receive a camera field of view from the camera, wherein the horizon is calculated based on the field of view in addition to the telemetry information and the zoom factor;
calculate a three-dimensional model of a ground plane; or
render a grid as an overlay image on the image or video feed, the grid having equal distances at ground level.

3. The UV controller as claimed in claim 2, wherein the grid overlay comprises one of:
a rectangular grid that spans from the bottom of the field of view out to the horizon; or
a radial grid that spans from the bottom of the field of view out to the horizon.

4. The UV controller as claimed in claim 1, wherein the processor is further configured to at least one of:
receive a horizon adjustment input, and adjust the rendered horizon by a factor associated with the horizon adjustment input; or
calculate a horizon adjustment factor, and adjust the rendered horizon by the horizon adjustment factor.

5. The UV controller as claimed in claim 2, wherein the processor is further configured to:
receive a first location selection input associated with a first image or video feed point;
calculate a first ground plane point associated with the first image or video feed point;
correlate the first ground plane point with telemetry information of the UV, the correlation resulting in global positioning system (GPS) coordinates of a first point on the ground associated with the first image or video feed point.

6. The UV controller as claimed in claim 5, wherein the processor is further configured to:
at least one of:
calculate a distance between the UV and the first image or video feed point; or
calculate a distance between a predetermined location and the first image or video feed point; and
render the distance at the display.

7. The UV controller as claimed in claim 5, wherein the processor is further configured to:
receive a second location selection input associated with a second image or video feed point;
calculate a second ground plane point associated with the second image or video feed point;
correlate the second ground plane point with telemetry information of the UV, the correlation resulting in GPS coordinates of a second point on the ground associated with the second image or video feed point;
calculate a distance between the first image or video feed point and the second image or video feed point; and
render the distance at the display.

8. The UV controller as claimed in claim 2, wherein the processor is further configured to:
receive an updated zoom factor from the camera;
recalculate the horizon and layout of the grid; and
update the horizon overlay and grid overlay renderings.

9. The UV controller as claimed in claim 2, wherein the processor is further configured to:
calculate an audibility model for a distance based on a loudness value of the UV;
generate a surface corresponding to the loudness value; and
render on the grid overlay where the surface intersects with the ground plane.

10. The UV controller as claimed in claim 1, wherein the telemetry information of the camera is the same as telemetry information of the UV.

11. A method for rendering a ground plane over image or video feed, the method comprising:
receiving, from a camera on a unmanned vehicle (UV), an image or video feed;
receiving, from the UV, telemetry information of the camera;
receiving, from the camera, a zoom factor of the camera;
calculating, at a UV controller of the UV, a horizon of the camera based upon the telemetry information and the zoom factor; and
rendering, at a display of the UV controller, the horizon as an overlay image on the image or video feed.

12. The method as claimed in claim 11, further comprising at least one of:
- receiving, from the camera, a field of view of the camera, wherein the horizon is calculated based on the field of view in addition to the telemetry information and the zoom factor;
- calculating, at the UV controller, a three-dimensional model of a ground plane; or
- rendering, at the display, a grid as an overlay image on the image or video feed, the grid having equal distances at ground level.

13. The method as claimed in claim 12, wherein the grid overlay comprises at least one of:
- a rectangular grid that spans from the bottom of the field of view out to the horizon; or
- a radial grid that spans from the bottom of the field of view out to the horizon.

14. The method as claimed in claim 11, further comprising at least one of:
- receiving, at the UV controller, a horizon adjustment input, and adjusting the rendered horizon by a factor associated with the horizon adjustment input; or
- calculating, at the UV controller, a horizon adjustment factor, and adjusting the rendered horizon by the horizon adjustment factor.

15. The method as claimed in claim 12, further comprising:
- receiving, at the UV controller, a first location selection input associated with a first image or video feed point;
- calculating, at the UV controller, a first ground plane point associated with the first image or video feed point;
- correlating, at the UV controller, the first ground plane point with telemetry information of the UV, the correlation resulting in GPS coordinates of a first point on the ground associated with the first image or video feed point.

16. The method as claimed in claim 15, further comprising:
- at least one of:
  - calculating, at the UV controller, a distance between the UV and the first image or video feed point; or
  - calculating, at the UV controller, a distance between a predetermined location and the first image or video feed point; and
- rendering, at the display, the distance.

17. The method as claimed in claim 15, further comprising:
- receiving, at the UV controller, a second location selection input associated with a second image or video feed point;
- calculating, at the UV controller, a second ground plane point associated with the second image or video feed point;
- correlating, at the UV controller, the second ground plane point with telemetry information of the UV, the correlation resulting in GPS coordinates of a second point on the ground associated with the second image or video feed point;
- calculating, at the UV controller, a distance between the first image or video feed point and the second image or video feed point; and
- rendering, at the display, the distance.

18. The method as claimed in claim 15, further comprising:
- receiving, from the camera, an updated zoom factor;
- recalculating the horizon and layout of the grid; and
- updating the horizon overlay and grid overlay renderings.

19. The method as claimed in claim 12, further comprising:
- calculating an audibility model for a distance based on a loudness value of the UV;
- generating a surface corresponding to the loudness value; and
- rendering on the grid overlay where the surface intersects with the ground plane.

20. An observer overlay system comprising:
- a processor;
- a communication interface for communicating with a camera; and
- a non-transitory memory device storing machine-readable instructions that, when executed by the processor, causes the processor to render a ground plane over images or video feed from the camera, the processor configured to:
  - receive an image or video feed from the camera;
  - receive telemetry information from the camera;
  - receive a zoom factor of the camera from the camera;
  - calculate a horizon of the camera based upon the telemetry information and the zoom factor; and
  - render the horizon as an overlay image on the image or video feed.

* * * * *